(12) United States Patent
Lutz et al.

(10) Patent No.: US 7,401,107 B2
(45) Date of Patent: Jul. 15, 2008

(54) DATA PROCESSING APPARATUS AND METHOD FOR CONVERTING A FIXED POINT NUMBER TO A FLOATING POINT NUMBER

(75) Inventors: David Raymond Lutz, Austin, TX (US); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 754 days.

(21) Appl. No.: 11/019,097

(22) Filed: Dec. 22, 2004

(65) Prior Publication Data

US 2006/0136536 A1 Jun. 22, 2006

(51) Int. Cl.
*G06F 5/00* (2006.01)

(52) U.S. Cl. ....................................... 708/204
(58) Field of Classification Search .................. 708/204
See application file for complete search history.

(56) References Cited

U.S. PATENT DOCUMENTS

| | | | | |
|---|---|---|---|---|
| 4,805,128 A | * | 2/1989 | Nelsen et al. | 708/204 |
| 6,131,104 A | * | 10/2000 | Oberman | 708/204 |
| 6,684,232 B1 | * | 1/2004 | Handlogten et al. | 708/204 |
| 6,990,505 B2 | * | 1/2006 | Ahmed | 708/204 |
| 7,062,525 B1 | * | 6/2006 | Lin | 708/497 |
| 2001/0056453 A1 | * | 12/2001 | Steele, Jr. | 708/497 |

* cited by examiner

*Primary Examiner*—David H Malzahn
(74) *Attorney, Agent, or Firm*—Nixon & Vanderhye P.C.

(57) ABSTRACT

A data processing apparatus and method are provided for converting an m-bit fixed point number to a rounded floating point number having an n-bit significand, where n is less than m. The data processing apparatus comprises determination logic for determining the bit location of the most significant bit of the value expressed within the m-bit fixed point number, and low order bit analysis logic for determining from a selected number of least significant bits of the m-bit fixed point number a rounding signal indicating whether a rounding increment is required in order to generate the n-bit significand. Generation logic is then arranged in response to the rounding signal to generate a rounding bit sequence appropriate having regard to the bit location determined by the determination logic. Adder logic then adds the rounding bit sequence to the m-bit fixed point number to generate an intermediate result, whereafter normalisation logic shifts the intermediate result to generate the n-bit significand. At this point, due to the incorporation of the rounding information prior to the addition, the generated n-bit significand is correctly rounded.

28 Claims, 7 Drawing Sheets

| bits 31:24 | MSB POSITION INDICATOR SIGNAL |
|---|---|
| 1xxxxxxx | 10000000 |
| 01xxxxxx | 01000000 |
| 001xxxxx | 00100000 |
| 0001xxxx | 00010000 |
| 00001xxx | 00001000 |
| 000001xx | 00000100 |
| 0000001x | 00000010 |
| 00000001 | 00000001 |
| 00000000 | 00000000 |

FIG. 3

| L | G | S | L' | G' | S' |
|---|---|---|----|----|----|
| 0 | 0 | 0 | 0 | 0 | 0 |
| 0 | 0 | 1 | 1 | 1 | 1 |
| 0 | 1 | 0 | 1 | 1 | 0 |
| 0 | 1 | 1 | 1 | 0 | 1 |
| 1 | 0 | 0 | 1 | 0 | 0 |
| 1 | 0 | 1 | 0 | 1 | 1 |
| 1 | 1 | 0 | 0 | 1 | 0 |
| 1 | 1 | 1 | 0 | 0 | 1 |

FIG. 5

DATA PROCESSING APPARATUS AND METHOD FOR CONVERTING A FIXED POINT NUMBER TO A FLOATING POINT NUMBER

BACKGROUND OF THE INVENTION

1. Field of the Invention

The present invention relates to a data processing apparatus and method for performing conversion from a fixed point number to a floating point number, and in particular to techniques for the handling of rounding when performing such conversion.

2. Description of the Prior Art

A floating point number can be expressed as follows:

$$\pm 1.x * 2^y$$

where: $x$ = fraction $1.x$ = significand (also known as the mantissa)

$y$ = exponent

A fixed point number format is one where the numbers are expressed by a predetermined number of bits, with the decimal point being considered to exist at a predetermined location within the number of bits. An integer is hence an example of a fixed point number in which the decimal point is considered to exist immediately to the right of the least significant bit position.

If the fixed point number consists of m bits, and is converted to a floating point number having an n-bit significand, it is often the case that n is less than m, and in such situations the floating point number needs to be subjected to a rounding process, as a result of which it may or may not be necessary to add a rounding increment to the significand in order to produce the correct n-bit significand for the rounded floating point number.

Whether a rounding increment will or will not be required will depend on the bit location of the most significant bit of the value expressed within the m-bit fixed point number. For an unsigned number or a positive signed number, this bit location will be given by the most significant logic one value in the number, whereas for a negative signed number, this bit location will be given by the most significant logic zero value in the number. If this bit location is within the least significant n bits of the m-bit fixed point number, then no rounding increment will need to be introduced, since the value can directly be expressed within the n-bit significand of the floating point number. However, if the most significant bit is at a location greater than the least significant n bits of the m-bit fixed point number, then it may be necessary to introduce a rounding increment dependent on the value of a certain number of least significant bits of the m-bit fixed point number.

Traditionally, when converting an m-bit fixed point number to a rounded floating point number having an n-bit significand, the following sequence of steps is performed to produce the n-bit significand:

1. The fixed point number is evaluated to determine if it is a signed negative number. If so, the number is negated and a logic one value is added to the negated value, thereby producing a two's complement version of the fixed point number.

2. The fixed point number, or the modified version produced in step 1 above in the event of a signed negative number, is then subjected to a leading one determination process in order to determine the location of the most significant bit of the value expressed within the m-bit fixed point number.

3. A left shift operation is then applied based on the leading one determination in order to normalise the number.

4. A rounding determination is then performed. If following the above normalisation process there are now only n bits or less remaining in the number, then no rounding is required since the entire value can be directly represented within the n-bit significand. However, if more than n bits are still remaining, then rounding may be appropriate depending on the value of certain least significant bits of the normalised number.

5. If rounding is required, then a rounding increment is introduced at the least significant bit of the destination precision. Hence, by way of example, if the floating point number is a single precision floating point number, and hence the significand is 24 bits in length, then if the normalised result has 28 bits (bits 0 to 27) a rounding increment if required will be introduced at bit 4, since bit 4 is the least significant bit of the 24-bit significand.

The above process is inherently serial, but it is desirable having regard to performance to try and perform some of the steps in parallel.

It is often the case that logic provided to perform such conversion operations is also used for other operations. For example, the logic provided to perform addition operations may also be re-used for such conversion operations. One particular arrangement of adder logic employs two split data paths, referred to as the far path and the near path. The near path is used for unlike signed additions (USAs) with equal exponents or exponents differing by one and significands guaranteed to differ by less than one. The far path handles all other additions. In the near path, no rounding of the result will be required but normalisation may be required due to massive cancellation. Such normalisation logic is not required in the far path. However, in the far path it is necessary to provide logic to account for rounding due to the fact that the input significands may need more than a 1-bit alignment. Through the use of the near and far paths, the pipeline depth of the pipeline required to perform addition can be reduced, since one path requires normalisation whilst the other does not, and one path requires rounding whilst the other does not.

When performing conversion operations in such adder logic, it is required to pass the conversion operation through the near path, since the near path provides the required normalisation logic. However, the near path would not normally have rounding logic provided, and accordingly there is a problem in performing any required rounding when performing such conversion operations. One way to solve this problem is to add a further final stage to the near path to allow such rounding to be performed, but this clearly adversely affects potential performance benefits that can be achieved by using an adder constructed with a near path and a far path.

The performance problem resulting from the provision of additional logic to perform a final rounding process is not limited to the above far path/near path implementation, but instead it is clear that performance of conversion operations will in general be adversely affected if additional rounding logic needs to be provided after the normalisation step.

Accordingly, it would be desirable to provide an improved technique for performing any required rounding when converting a fixed point number to a floating point number, so as to improve the speed of the operation.

SUMMARY OF THE INVENTION

Viewed from a first aspect, the present invention provides a data processing apparatus for converting an m-bit fixed point number to a rounded floating point number having an n-bit significand, where n is less than m, the data processing apparatus comprising: determination logic operable to determine the bit location of the most significant bit of the value expressed within the m-bit fixed point number; low order bit analysis logic operable to determine from a selected number of least significant bits of the m-bit fixed point number a rounding signal indicating whether a rounding increment is required in order to generate the n-bit significand; generation logic operable in response to the rounding signal to generate a rounding bit sequence appropriate having regard to the bit location determined by the determination logic; adder logic operable to add the rounding bit sequence to the m-bit fixed point number to generate an intermediate result; and normalisation logic operable to shift the intermediate result to generate the n-bit significand.

In accordance with the present invention, determination logic is provided to determine the bit location of the most significant bit of the value expressed within the m-bit fixed point number, whilst low order bit analysis logic determines from a selected number of least significant bits of the m-bit fixed point number a rounding signal, this rounding signal identifying whether a rounding increment is required in order to generate the n-bit significand. Generation logic is then responsive to the rounding signal to generate a rounding bit sequence appropriate having regard to the bit location determined by the determination logic. Adder logic is then used to add the rounding bit sequence to the m-bit fixed point number to generate an intermediate result. Thereafter, all that is required is to shift the intermediate result to generate the n-bit significand. At this point the n-bit significand is correctly rounded.

Accordingly, a rounding bit sequence is determined prior to the fixed point number passing through adder logic, and the adder logic is used to incorporate the rounding bit sequence into the fixed point number. It should be noted that the adder logic is in any case required to generate the two's complement version of the fixed point number in the event that the fixed point number is a negative signed number, and so the inclusion of the rounding bit sequence as the fixed point number passes through the adder logic represents a particularly efficient technique for performing any necessary rounding increment.

Considering as an example a pipelined data processing apparatus, it has been found that the determination logic, low order bit analysis logic and generation logic can all be incorporated in an initial pipeline stage used to perform some initial set up processing on the fixed point number prior to it being passed to an adder. The addition can then be performed in a second pipeline stage, with the normalisation being performed in a subsequent pipeline stage. This technique hence provides at least a one stage saving when compared with the prior art technique which would need to incorporate rounding logic in a further stage following the normalisation.

In one embodiment, the rounding signal is set if the rounding increment is required, and if the rounding signal is not set the generation logic is operable to generate a rounding bit sequence comprising all zeros. By generating a rounding bit sequence comprising all zeros, this will ensure that the fixed point number is not incremented as it passes through the adder logic.

In one embodiment, if the bit location determined by the determination logic is within the least significant n bits, the generation logic is operable to generate a rounding bit sequence comprising all zeros. Again, in this situation, by setting the rounding bit sequence to all zeros, this will ensure that the fixed point number is not incremented as it passes through the adder logic. This is appropriate in the current situation, since all of the significant bits of the fixed point number can directly be represented within the n-bit significand of the floating point number, and accordingly a rounding increment is not required.

The low order bit analysis logic can be arranged in a variety of ways. However, in one embodiment, the low order bit analysis logic is operable to determine from the selected number of least significant bits of the m-bit fixed point number a plurality of rounding signals, each rounding signal being associated with a particular bit position and indicating whether a rounding increment is required in order to generate the n-bit significand if the most significant bit of the value expressed within the m-bit fixed point number resides at that associated bit position; the generation logic being operable in response to the plurality of rounding signals to generate a rounding bit sequence appropriate having regard to the bit location determined by the determination logic.

Hence, in accordance with this embodiment, a plurality of rounding signals are produced, one for each possible bit position for which it might be appropriate to perform rounding, and the generation logic is then operable to generate a rounding bit sequence appropriate having regard to the bit location determined by the determination logic. In particular, that bit location will identify which of the rounding signals is relevant, and the value of that rounding signal will determine whether a rounding increment is required, and will hence determine the appropriate rounding bit sequence to be used.

In one embodiment, each rounding signal is set if the rounding increment is required, and if the rounding signal associated with the bit position determined by the determination logic is not set the generation logic is operable to generate a rounding bit sequence comprising all zeros.

The determination logic may be arranged to indicate the bit location of the most significant bit of the value expressed within the m-bit fixed point number in a variety of ways. However, in one embodiment, the determination logic is operable to produce a m-n bit value identifying the bit location of the most significant bit of the value expressed within the m-bit fixed point number, and the generation logic is operable to perform a logical AND operation on the m-n bit value and the plurality of rounding signals in order to generate the rounding bit sequence. This provides a particularly efficient technique for generating the required rounding bit sequence. In one embodiment, the m-n bit value will be output if the relevant rounding signal is set, whereas otherwise the rounding bit sequence will comprise all zeros.

In one embodiment, if the bit location determined by the determination logic is within the least significant n bits, the determination logic is operable to produce a m-n bit value comprising all zeros, thereby causing the generation logic to generate a rounding bit sequence comprising all zeros.

Floating point addition can take two forms, namely like-signed addition (LSA) or unlike-signed addition (USA). An LSA operation is performed if two floating point operands of the same sign are to be added, or if two floating point operands of different signs are to be subtracted. Similarly, an USA operation is performed if two floating point operands of different sign are to be added, or if two floating point operands of the same sign are to be subtracted. When referring in the present application to the addition performed by the adder logic, this should be taken as collectively referring to LSA or USA computations. In one particular embodiment, if the m-bit fixed point number is an unsigned number or a positive signed number, the adder logic is operable to perform a like signed addition operation, whereas if the m-bit fixed point number is a negative signed number the adder logic is operable to perform an unlike signed addition operation.

In one embodiment, a single rounding mode is provided for producing the rounded floating point operand. In one particular embodiment, this single rounding mode is a round-to-nearest rounding mode. In accordance with the round-to-nearest rounding mode, also referred to as the "Round-to-Nearest-Even" (RNE) rounding mode, values that are more than half way between two representable results are rounded up, whilst values that are less than half way between two representable results are rounded down (or truncated). Values that are exactly half way between two representable results are rounded to a final result that has a least significant fraction bit equal to zero, thus making the result even.

In one embodiment, for each rounding signal the low order bit analysis logic is operable to determine from the selected number of least significant bits a significand initial least significant bit, a guard bit immediately to the right of the significand initial least significant bit, and a sticky bit produced by performing a logical OR operation on all other bits to the right of the guard bit, the location of the significand initial least significant bit being dependent on the bit location associated with each rounding signal, and the lower order bit analysis logic being operable to use the significand initial least significant bit, the guard bit and the sticky bit in determining that rounding signal.

Hence, for each rounding signal, a corresponding significand initial least significant bit, guard bit and sticky bit is determined, and then a logical operation is performed on these three values in order to determine the value of the rounding signal.

In one embodiment, the low order bit analysis logic is operable to produce first and second sets of rounding signals, the first set being referenced by the generation logic if the m-bit fixed point number is an unsigned number or a positive signed number, and the second set being referenced by the generation logic if the m-bit fixed point number is a negative signed number, the low order bit analysis logic being operable to generate modified versions of each significand initial least significant bit, guard bit and sticky bit and to use the modified versions when computing each rounding signal of the second set.

In one embodiment, the rounded floating point number is a single precision floating point number, and n is 24. In one such embodiment, the m-bit fixed point number is a 32-bit number. In another embodiment, the conversion is from a 64-bit fixed point number to a double precision (n is 53) rounded floating point number. It will be appreciated that rounding will be required whenever the fixed point number has a number of bits greater than the number of bits of the significand.

Viewed from a second aspect, the present invention provides a method of operating a data processing apparatus to convert an m-bit fixed point number to a rounded floating point number having an n-bit significand, where n is less than m, the method comprising the steps of: (a) determining the bit location of the most significant bit of the value expressed within the m-bit fixed point number; (b) determining from a selected number of least significant bits of the m-bit fixed point number a rounding signal indicating whether a rounding increment is required in order to generate the n-bit significand; (c) in response to the rounding signal, generating a rounding bit sequence appropriate having regard to the bit location determined at said step (a); (d) employing adder logic to add the rounding bit sequence to the m-bit fixed point number to generate an intermediate result; and (e) shifting the intermediate result to generate the n-bit significand.

BRIEF DESCRIPTION OF THE DRAWINGS

The present invention will be described further, by way of example only, with reference to an embodiment thereof as illustrated in the accompanying drawings, in which:

FIG. 3 is a table illustrating the possible output values produced by the leading bit determination logic of FIG. 2;

FIG. 5 is a table illustrating the correspondence between least significant bits, guard bits and sticky bits, and corresponding modified versions of those bits used in one embodiment when computing within the rounding determination logic rounding signals appropriate for negative signed numbers;

DESCRIPTION OF EMBODIMENTS

Figure 1:
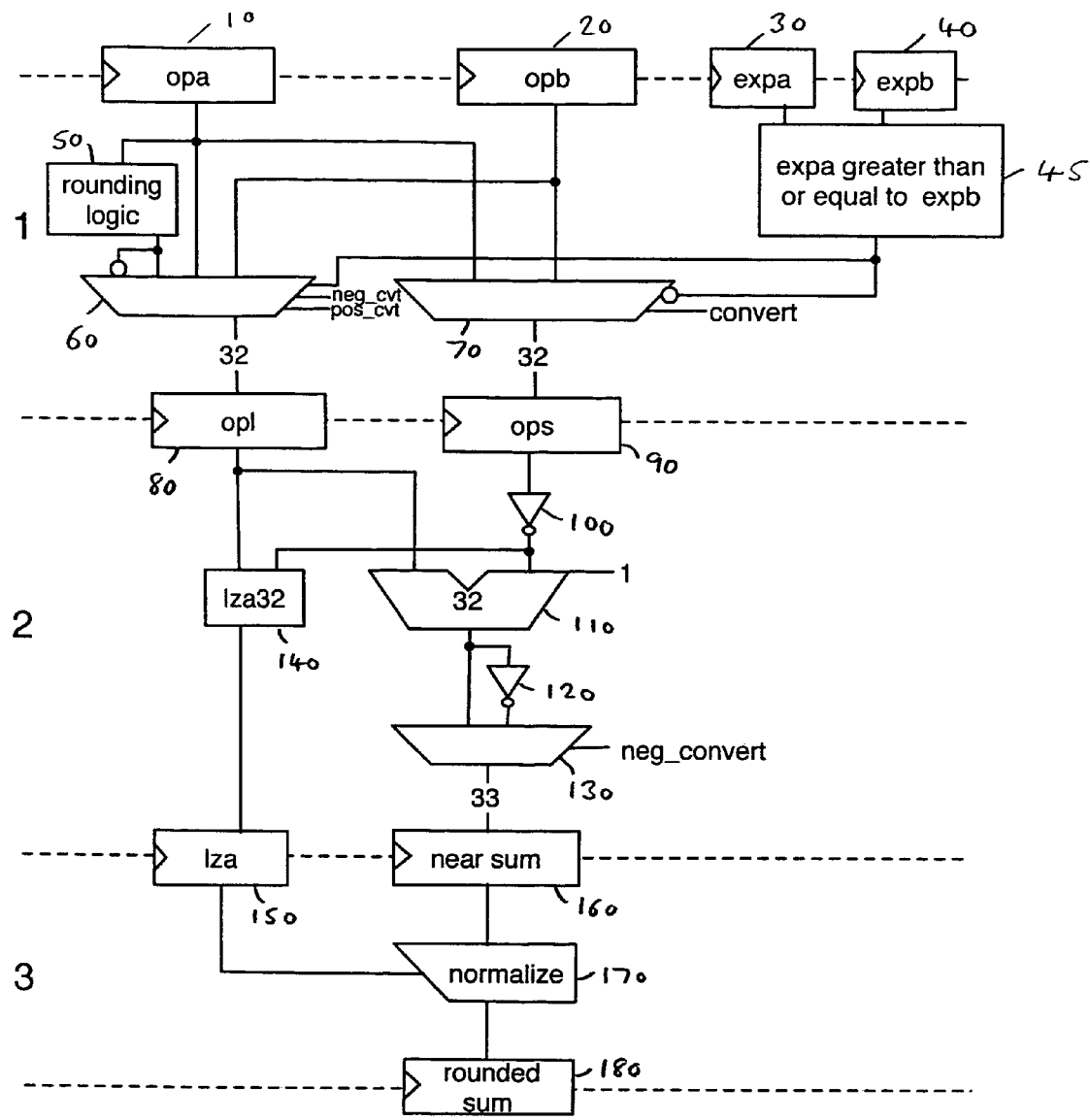
FIG. 1 is a block diagram of logic provided within a data processing apparatus in accordance with one embodiment of the present invention to produce a significand of a floating point number when converting a fixed point number to a floating point number.

FIG. 1 is a block diagram illustrating logic provided within a data processing apparatus in accordance with one embodiment of the present invention and used to produce an n-bit significand when converting an m-bit fixed point number to a floating point number. In the particular embodiment illustrated in FIG. 1, the logic of FIG. 1 is contained within the near path of adder logic provided within the data processing apparatus. The adder logic may be used to add two floating point operands, with the particular logic in FIG. 1 being used to add the significands of the two floating point operands. For the sake of illustration, when the logic of FIG. 1 is used to add floating point operands, it is assumed that the input operands are single precision floating point operands, and according each operand consists of a 1-bit sign value, an 8-bit exponent value and a 23-bit fraction value. The 23-bit fraction value will be converted into a 24-bit significand and the 24-bit significands from both floating point operands will be provided to the registers 10, 20, respectively. The corresponding exponents are stored within the registers 30, 40, respectively.

When performing addition, the first stage takes the original significand values, here referred to as opa and opb, and based on an exponent comparison performed by the logic 45, generates two new operands, opl and ops. Opl is the significand of the larger operand and ops is the significand of the smaller operand. As can be seen from FIG. 1, the logic 45 determines whether the exponent of operand a is greater than or equal to the exponent of operand b and if so outputs a logic one value. If not, the logic 45 outputs a logic zero value. The multiplexer 60 receives the signal output by the logic 45, and the multiplexer 70 receives an inverted version of that output signal from the logic 45. As can be seen from FIG. 1, if the exponent a is greater than or equal to the exponent b, this will cause opa to be output by multiplexer 60 as opl and opb to be output by multiplexer 70 as ops, opl being stored in register 80 and ops being stored in register 90. Similarly, if it is determined that the exponent of operand a is less than the exponent of operand b, this will cause opb to be output by multiplexer 60 as op1 and opa to be output by multiplexer 70 as ops.

The first stage is common to both the near and far paths. However, the second and third stages are split into the far path and the near path, with only the near path being shown in FIG. 1. The near path is used for USA operations with equal exponents or exponents differing by one and significands guaranteed to differ by less than one. The far path is used for all other addition operations. As can be seen from FIG. 1, the inverter 100 in combination with the adder 110, performs the operation "op1−ops", which is the correct result assuming op1 was larger than ops. However, since in the near path the exponents may be equal, it is possible that the selection made in the first stage was incorrect. To allow this to be corrected, some fix-up logic (not shown in FIG. 1) can be provided which determines during stage one whether ops is in fact greater than op1, and in that instance resets the carry-in to the adder logic 110 to zero, and causes multiplexer 130 to select an inverted version of the output of the adder 110 (produced by inverter 120) so that the result equates to "ops−op1".

Leading zero anticipator logic 140 is also provided in the second stage to find the leading significant bit in the sum "op1+$\overline{ops}$". More precisely, it anticipates the bit position of the leading significant one in the positive result, and it is possible that it may be out by one bit position. As will be discussed later, this can be fixed by the normalize logic 170. The output from the LZA logic 140 hence identifies an anticipated value of a left shift to be performed to normalise the result, this value being stored in the register 150. The output of the multiplexer 130 is stored in the register 160 at the end of the second stage.

In the third stage, normalisation logic 170 performs a left shift on the data in register 160, with the number of bit positions shifted being indicated by the output from register 150. If the leading bit of the result of that shift operation is still a zero, this indicates that the anticipation performed by the logic 140 was one bit out and this is corrected at the tail end of the normalization logic by considering the most significant bit of the result to be the bit immediately to the right of the leading bit. The result is then stored in the register 180. For near path additions, no rounding of the result will be required, and accordingly the data in register 180 represents the final sum.

The above discussion of the operation of the logic of FIG. 1 when performing addition of two significands of floating point operands is provided merely for background information. In accordance with one embodiment of the present invention, the same logic is also used during conversion of a fixed point number to a floating point number in order to generate the significand of that floating point number. In particular, in the example illustrated in FIG. 1, a 32-bit fixed point number stored as opa in register 10 is converted into a single precision floating point number having a 24-bit significand. The logic used in FIG. 1 is used to generate the 24-bit significand from the 32-bit fixed point number stored as opa in register 10. It will be appreciated that in an alternative embodiment the fixed point number could be stored as opb in register 20.

When performing the conversion operation, the contents of registers 20, 30 and 40 are not relevant, and the exponent comparison logic 45 is not used. Instead, a "convert" control signal is set to the multiplexer 70 to cause the multiplexer to output as ops the fixed point number stored as opa in register 10, this 32-bit value being stored in register 90 at the end of stage one. Typically, prior to the present invention, op1 would have been set to zero. This would then enable the input fixed point number to be added to or subtracted from zero in the second stage (the subtraction being performed when the input fixed-point number is a negative signed number). Then in stage three, the number would be normalised such that the leading bit would then be a one. However, with such an approach, a further stage would be required to perform any necessary rounding of the result so as to produce a rounded 24-bit significand from the input 32-bit fixed point number.

However, in accordance with embodiments of the present invention, the need for a further rounding stage is avoided by calculating the necessary rounding information in the first stage, and incorporating any necessary rounding increment in the data value op1 stored in register 80 at the end of stage one.

In particular, rounding logic 50 is provided in stage one to precompute the rounding information at each of eight possible rounding locations (namely bits [8:1] out of bits [31:0]), given that a 32-bit number is being converted into a 24-bit significand. The rounding computation is different for positive and negative inputs, but there are still only fifteen possibilities to compute. At the same time, the rounding logic determines the leading one (or leading zero for negative inputs) if it is in one of the high order 8 bits. If this leading value is not in one of the most significant 8 bits, then no rounding is required. However, if this value is in one of the most significant 8 bits, then an appropriate rounding bit sequence is selected and inserted into op1 during stage one. Given that op1 would previously have been set to zero in any case, it is clear that op1 is readily available to receive this rounding value. In stages 2 and 3, the addition and normalisation steps are performed, with the result that the 24-bit value stored in register 180 at the end of stage 3 is already correctly rounded. Accordingly, any further rounding stage is completely unnecessary.

The operation of the rounding logic 50 will be discussed in more detail later. For the time being, it suffices to say that it generates an 8-bit rounding bit sequence which is then input to multiplexer 60. The multiplexer 60 also receives an inverted version of the 8-bit rounding bit sequence. The multiplexer receives control signals indicating whether the conversion operation is a conversion of a negative signed number, or alternatively is a conversion of a positive signed number or an unsigned number. If the conversion is a conversion of a negative signed number, then the rounding bit sequence output by the rounding logic is output as op1 for storage in register 80, whereas otherwise the inverted version of the rounding bit sequence is output as op1 for storage in register 80. In either case, the rounding bit sequence (or the inverted version) constitutes bits 8 to 1 of op1, but in the embodiment illustrated in FIG. 1 op1 is generated as a 32-bit number, with the remaining bits (i.e. those bits other than bits 8 to 1) being set to zero.

In stage 2, ops is inverted by inverter 100 prior to input to the adder 110, the adder 110 also receiving a carry-in value set to one. Accordingly, it can be seen that the adder performs the computation "op1−ops". The value output by the adder is then passed to multiplexer 130, which also receives the inverted version of that output as generated by the inverter 120.

The multiplexer 130 receives a "neg_convert" signal which is set to a logic one value if the fixed point number being converted is a negative signed number. In the event that the neg_convert signal is set, then the output from adder 110 is routed to the register 160, whereas otherwise the inverted version of the output produced by the inverter 120 is routed to the register 160. At this stage the value stored in the register 160 is a 33-bit value. The reason why this logic in stage 2 performs the required computation in order to add the rounding bit sequence to the fixed point number for both positive/unsigned and negative variants will now be illustrated as follows:

For unsigned and positive signed numbers, the required computation (where $r_{inc}[8:1]$ is the rounding bit sequence generated by the rounding logic 50) is:

$$ops + r_{inc}[8:1]$$

For these types of numbers $r_{inc}[8:1]$ is inverted in stage 1, such that $opl = \overline{r_{inc}}$ (expanded to 32-bits by setting the remaining bits to one).

The adder 110 performs the computation $$opl - ops$$

which is then inverted by inverter 120 to give $$\overline{opl - ops}$$

$$\overline{opl - ops} = -(opl - ops) - 1 \text{ (since } \bar{x} = -x - 1)$$
$$= -opl + ops - 1$$
$$= \overline{opl} + ops$$
$$r_{inc} + ops \text{ (i.e the required computation)}$$

For negative signed numbers, the required computation is:

$-ops + r_{inc}[8:1]$ (due to fact that the significand is always expressed as a positive number, with the separate sign bit expressing the sign).

$r_{inc}[8:1]$ is not inverted in stage 1, so $opl = r_{inc}$ (expanded to 32 bits by setting the remaining bits to zero)

The adder 110 performs the computation opl−ops, and no inversion of the result takes place.

$opl - ops = r_{inc} - ops = -ops + r_{inc}$ (i.e. the required computation)

During stage 2, the leading zero anticipator 140 receives the value opl and the inverted version of the value ops, and using that information finds the leading significant bit in the sum "opl+$\overline{ops}$". As discussed earlier, it is possible that this anticipated value may be out by one bit position.

Once the leading significant bit has been anticipated by the logic 140, a value indicating the location of that leading significant bit is stored within the register 150 at the end of cycle 2.

In cycle 3, the normalisation logic 170 then performs a left shift operation on the 33 bit value stored in register 160, with the number of bit positions shifted being dependent on the value stored in register 150. If the leading bit of the result of that shift operation is still a zero, this indicates that the anticipation performed by the logic 140 was one bit out and this is corrected at the tail end of the normalization logic by considering the most significant bit of the result to be the bit immediately to the right of the leading bit. The above process results in a normalised result being stored within the register 180. The significand is then given by the most significant 24 bits stored in the register 180, and indeed the register 180 can be arranged just to store those most significant 24 bits. Given that any rounding increment has already been introduced during the addition performed in stage 2, then the 24-bit significand stored in the register 180 is already correctly rounded, and hence no further processing is required.

Figure 2:
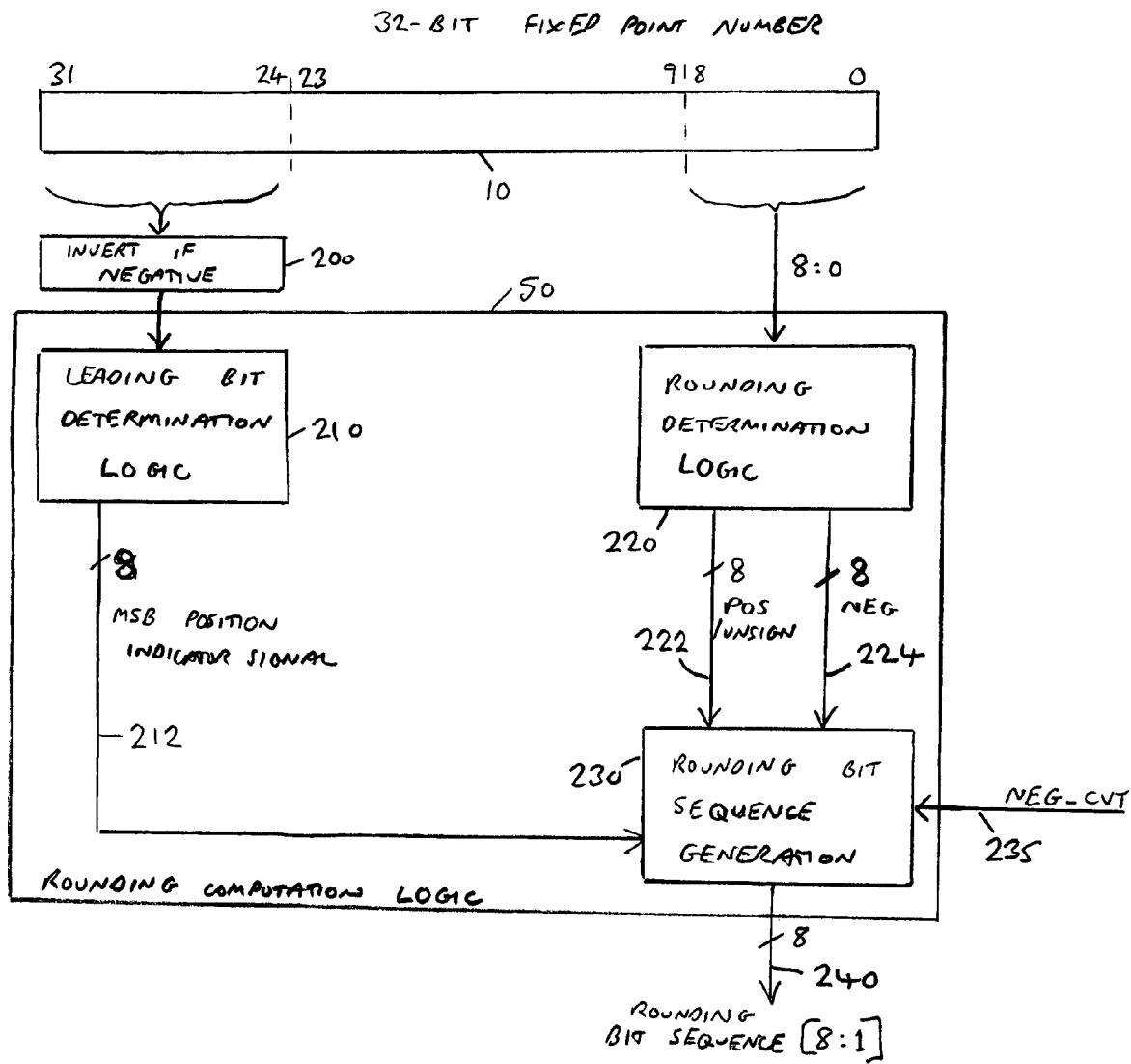
FIG. 2 is a block diagram illustrating in more detail the rounding logic of FIG. 1.

FIG. 2 is a block diagram illustrating in more detail the logic provided within the rounding logic 50 of FIG. 1. As shown in FIG. 2, leading bit determination logic 210 is arranged to receive the most significant 8 bits (i.e. bits 24 to 31) of the 32-bit fixed point number, with those bits being inverted prior to input to the leading bit determination logic 210 by the inversion logic 200 if the fixed point number is a negative signed number. Otherwise, no inversion takes place. The leading bit determination logic 210 then assesses the location of a leading one in those 8 bits, and produces an 8-bit output signal whose value is dependent on the identified location of the leading one. In particular, an 8-bit most significant bit (MSB) position indicator signal is produced in accordance with the table shown in FIG. 3. For unsigned numbers, it will be appreciated that bits 31 to 24 can take any one of the nine forms illustrated in the table of FIG. 3, whereas for signed numbers only the lower eight entries are relevant, since a positive signed number will always begin with a zero, as will an inverted negative signed number.

With regard to the last entry of the table in FIG. 3, this entry is the situation where the leading one is within the least significant 24 bits, and accordingly no rounding is required. In that situation, the MSB position indicator signal is an 8-bit signal comprising all zeros.

As also shown in FIG. 2, rounding determination logic 220 is arranged to receive bits 8 to 0 of the 32-bit fixed point number, and based thereon to produce sixteen separate rounding signals, which can be considered to be grouped into two sets of eight rounding signals, the first set being applicable for unsigned numbers and positive signed numbers and the second set being applicable for negative signed numbers. As will be discussed in more detail later, the eighth rounding signal of the second set can be predetermined. Each rounding signal is associated with a particular bit position, and indicates whether a rounding increment is required in order to generate the significand if the most significant bit of the value expressed within the fixed point number resides at that associated bit position. The rounding signal will be set to indicate that a rounding increment is required, or not set if no rounding increment is required. More details of the operation of the rounding determination logic 220 is illustrated in FIG. 4.

Figure 4:
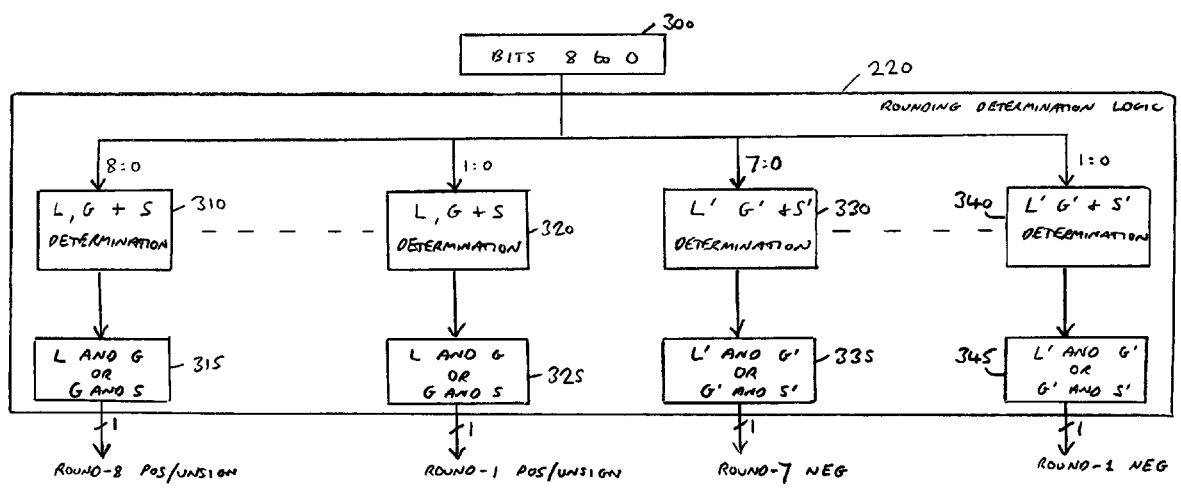
FIG. 4 is a block diagram illustrating in more detail the rounding determination logic of FIG. 2.

As illustrated in FIG. 4, a number of sets of logic are arranged to operate in parallel on selected bits of bits 8 to 0 300. If the most significant bit of the value expressed within the 32-bit fixed point number is at bit position 31, then it will be appreciated that the n-bit significand will be expressed by bits 31 to 8, with any necessary rounding increment being introduced at bit position 8 based on an analysis of bits 8 to 0. In particular, bit 8 will form the least significant (L) bit, bit 7 will form the guard (G) bit, and a logical OR operation performed on bits 6 to 0 will produce the sticky (S) bit. L, G and S determination logic 310 produces the L, G and S values for the above situation. Seven other analogous pieces of logic are arranged to perform similar L, G and S determination for each of the other leading one positions in bits 24 to 31 (i.e. all the locations where a rounding increment may be required). As mentioned earlier, if the leading one is at bit position 23 or lower, then no rounding increment will be required. In FIG. 4, only two logic elements 310, 320 of the eight are shown for clarity. The determination logic 320 only receives bits 1 and 0, bit 1 being the least significant bit position if the most significant bit is at bit position 24, and bit 0 forming the guard bit. In this situation, there are no bits contributing to the sticky bit, and accordingly the sticky bit is zero.

In accordance with the embodiment of the present invention illustrated in the figures, rounding is performed having regard to the RNE rounding mode. In accordance with this rounding mode, rounding is in fact required if the result of the following computation is set:

(L AND G) OR (G AND S).

As shown in FIG. 4, logic elements 315, 325 are provided in association with each piece of determination logic 310, 320, and accordingly eight such sets of logic are provided. This results in the production of eight 1-bit rounding signals, with each 1-bit rounding signal being set to indicate if a rounding increment is required in order to generate the significand if the most significant bit of the value expressed within the fixed point number resides at the associated bit position. Hence, the rounding signal produced by logic element 315 indicates whether a rounding increments needs to be injected at bit position 8, whilst the rounding signal produced by logic element 325 indicates whether a rounding increment is required at bit position 1.

The computation has to be adjusted for negative values. For example:

opa=0xf000_0020

$\overline{\text{opa}}$=0x0fff_ffdf

−opa=0x0fff_ffe0

If rounding were to be based on $\overline{\text{opa}}$, this would be incorrect, since the true value being converted is −opa. This problem is avoided by converting the values L, G, and S from the input opa to true L', G', and S' by computing L'G'S' =−(LGS)= $\overline{\text{LGS}}$+1, with the result shown in FIG. 5.

Figure 6:
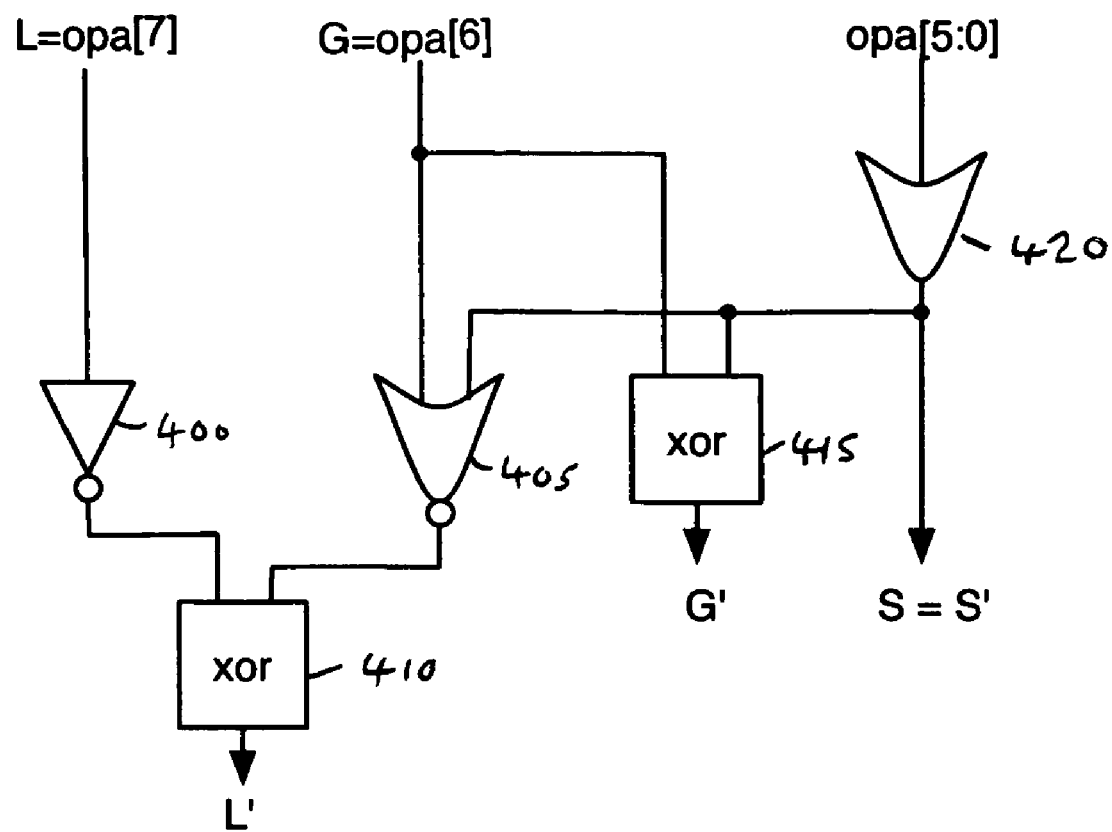
FIG. 6 is a block diagram illustrating logic arranged to produce the required modified versions of the least significant bit, guard bit and sticky bit in accordance with the table of FIG. 5.

The determination of the L', G' and S' values is performed by a series of logic elements 330, 340, only two of which are shown in FIG. 4. As with the determination performed for positive signed numbers or unsigned numbers, one piece of logic exists for each possible bit position at which a leading one may be determined by the leading bit determination logic 210. Hence, logic 330 looks at bit positions 7 to 0 (bit 31 can never be 1 for a negative signed number, since the value is inverted prior to being considered by the leading bit determination logic 210). At the other end of the scale, logic 340 will receive just bits 1 to 0. Each of the items of logic 330, 340 performs the computation required to derive L', G' and S' values. The logic provided within determination logic 330 in order to derive the L', G' and S' values is illustrated in FIG. 6. OR gate 420 receives the bits contributing to the sticky bit, and performs a logical OR operation in order to produce the sticky bit value S, which as is apparent from the earlier FIG. 5 is also equivalent to S'. The G' value is produced by XOR logic 415 which performs an XOR operation on the guard bit and the sticky bit produced by OR gate 420.

NOR gate 405 receives the guard bit and the sticky bit produced by OR gate 420, and hence produces a logic zero level output except for the situation where the guard bit and the sticky bit are both zero, in which event it produces a logic one value. The output from NOR gate 405 is supplied to XOR gate 410. Inverter 400 inverts the L bit prior to input to XOR gate 410, and XOR gate 410 generates the L' value. Hence, it can be seen that the L' value will be given by the inverted L value produced by inverter 400 except in the situation where the guard bit and S bit are both at a logic zero value, in which event the XOR gate 410 will cause the output from inverter 400 to be reinverted, hence causing the L' value to be equal to the original L value.

An analogous piece of logic will be provided within each of the other pieces of determination logic provided for negative signed values. For the determination logic 340, the L bit will be given by bit 1 of opa, the G bit will be given by bit 0 of opa, and the OR gate 420 is not required since S will always be a logic zero value. Given that S is always 0, XOR gate 415 is not needed and NOR gate 405 is replaced with an inverter.

Once the L', G' and S' values have been determined for each of the relevant combination of least significant bits, then corresponding rounding signal generation logic 335, 345 takes the generated L', G' and S' values and performs the computation:

(L' AND G') OR (G' AND S')

If the result of this computation is set, then a rounding increment is required.

As mentioned earlier, bit 31 can never be 1 for a negative signed number, since the value is inverted prior to being considered by the leading bit determination logic 210. However, to ensure that both sets of rounding signals output over paths 222, 224, respectively consist of eight bits, an eighth bit (not shown in FIG. 4) having a predetermined value, for example zero, is output from the rounding determination logic 220 over path 224.

Figure 7:
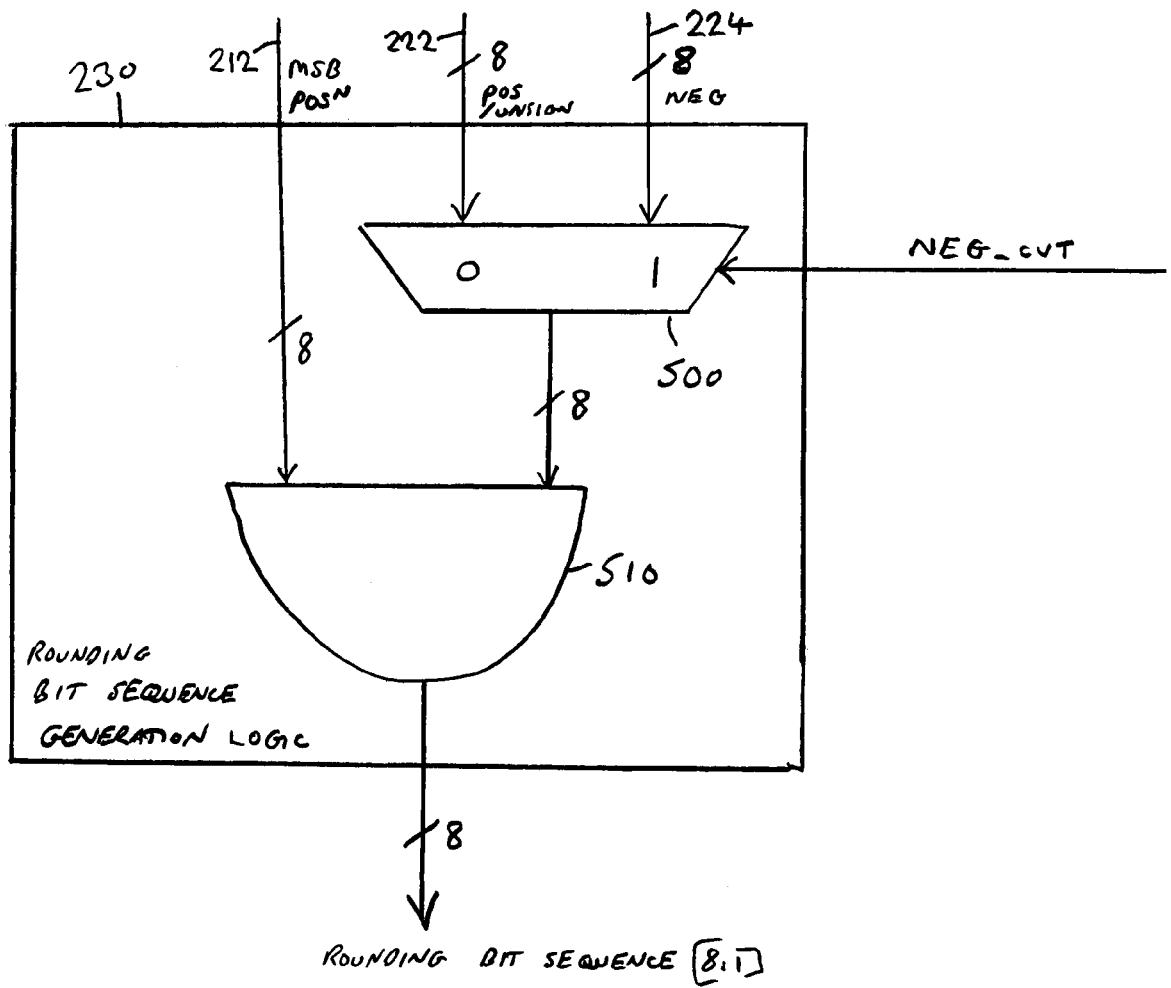
FIG. 7 is a block diagram illustrating in more detail the rounding bit sequence generation logic of FIG. 2.

FIG. 7 illustrates in more detail the operation performed by the rounding bit sequence generation logic 230 of FIG. 2. The two sets of rounding signals are output by rounding determination logic 220 over paths 222 and 224, respectively, these two sets of signals being routed to multiplexer 500. The multiplexer receives as a control signal a NEG_CVT signal which is set if the conversion being performed is a conversion of a negative signed number. In the event that the NEG_CVT value is set, then the multiplexer 500 outputs the second set of rounding signals, whereas otherwise the multiplexer 500 outputs the first set of rounding signals.

AND gate 510 receives the output from multiplexer 500 and the 8-bit value output by leading bit determination logic 210, and performs a logical AND operation in order to produce an 8-bit rounding bit sequence for use in forming bits 8 to 1 of opl stored in register 80. In particular, as described earlier, for the conversion of a negative signed number, the 8-bit rounding bit sequence is used directly as bits 8 to 1 of opl, whereas for the conversion of positive signed numbers or unsigned numbers, the 8-bit rounding bit sequence is inverted prior to forming bits 8 to 1 of opl.

One point worthy of note is that, as shown in FIG. 2, bits 24 to 31 of the fixed point number are merely inverted if the fixed point number is a negative signed number prior to consideration by the leading bit determination logic 210. Hence, the leading bit determination logic 210 is reviewing a one's complement of the leading 8 bits rather than the true two's complement. However, the location of the most significant bit, and hence the associated location for introducing any rounding increment, can be determined by looking at the one's complement of the leading 8 bits, and the only time the location will be wrong is for conversion of negative numbers with a large number of trailing zeros, such as 0xF000_0000. Fortunately, in this case there is no rounding increment generated because LGS=L'G'S'=000 (see entry one of the table in FIG. 5).

From the above description of an embodiment of the present invention, it will be appreciated that embodiments of the present invention provide a technique in which all required rounding information is determined prior to the addition and normalisation steps being performed, thus avoiding the need for any subsequent rounding step following the normalisation when converting a fixed point number into a floating point number. In particular, such embodiments take advantage of the fact that there only a limited number of possible rounding locations, and that all rounding information is available in the first stage. Hence, whilst the operand selection/swapping operation is being performed in the first stage, a rounding value is computed and inserted into the unused operand location, since conversion operations only have one true operand. The result coming out of the adder is then correctly rounded, and merely needs to be normalised in order to produce the rounded significand.

It will be appreciated that embodiments of the present invention will have wide applicability in data processing systems where it is necessary to convert fixed point numbers to floating point numbers. As an example, the technique of embodiments of the present invention may be used in general purpose floating-point systems, graphics accelerators, high-end DSPs (Digital Signal Processors), etc.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for converting an m-bit fixed point number to a rounded floating point number having an n-bit significand, where n is less than m, the data processing apparatus comprising:
   determination logic operable to determine the bit location of the most significant bit of the value expressed within the m-bit fixed point number;
   low order bit analysis logic operable to determine from a selected number of least significant bits of the m-bit fixed point number a rounding signal indicating whether a rounding increment is required in order to generate the n-bit significand;
   generation logic operable in response to the rounding signal to generate a rounding bit sequence appropriate having regard to the bit location determined by the determination logic;
   adder logic operable to add the rounding bit sequence to the m-bit fixed point number to generate an intermediate result; and
   normalization logic operable to shift the intermediate result to generate the n-bit significand.

2. A data processing apparatus as claimed in claim 1, wherein the rounding signal is set if the rounding increment is required, and if the rounding signal is not set the generation logic is operable to generate a rounding bit sequence comprising all zeros.

3. A data processing apparatus as claimed in claim 1, wherein if the bit location determined by the determination logic is within the least significant n bits, the generation logic is operable to generate a rounding bit sequence comprising all zeros.

4. A data processing apparatus as claimed in claim 1, wherein:
   the low order bit analysis logic is operable to determine from the selected number of least significant bits of the m-bit fixed point number a plurality of rounding signals, each rounding signal being associated with a particular bit position and indicating whether a rounding increment is required in order to generate the n-bit significand if the most significant bit of the value expressed within the m-bit fixed point number resides at that associated bit position;
   the generation logic being operable in response to the plurality of rounding signals to generate a rounding bit sequence appropriate having regard to the bit location determined by the determination logic.

5. A data processing apparatus as claimed in claim 4, wherein each rounding signal is set if the rounding increment is required, and if the rounding signal associated with the bit position determined by the determination logic is not set the generation logic is operable to generate a rounding bit sequence comprising all zeros.

6. A data processing apparatus as claimed in claim 4, wherein the determination logic is operable to produce a m-n bit value identifying the bit location of the most significant bit of the value expressed within the m-bit fixed point number, and the generation logic is operable to perform a logical AND operation on the m-n bit value and the plurality of rounding signals in order to generate the rounding bit sequence.

7. A data processing apparatus as claimed in claim 6, wherein if the bit location determined by the determination logic is within the least significant n bits, the determination logic is operable to produce a m-n bit value comprising all zeros, thereby causing the generation logic to generate a rounding bit sequence comprising all zeros.

8. A data processing apparatus as claimed in claim 4, wherein for each rounding signal the low order bit analysis logic is operable to determine from the selected number of least significant bits a significand initial least significant bit, a guard bit immediately to the right of the significand initial least significant bit, and a sticky bit produced by performing a logical OR operation on all other bits to the right of the guard bit, the location of the significand initial least significant bit being dependent on the bit location associated with each rounding signal, and the lower order bit analysis logic being operable to use the significand initial least significant bit, the guard bit and the sticky bit in determining that rounding signal.

9. A data processing apparatus as claimed in claim 8, wherein the low order bit analysis logic is operable to produce first and second sets of rounding signals, the first set being referenced by the generation logic if the m-bit fixed point number is an unsigned number or a positive signed number, and the second set being referenced by the generation logic if the m-bit fixed point number is a negative signed number, the low order bit analysis logic being operable to generate modified versions of each significand initial least significant bit, guard bit and sticky bit and to use the modified versions when computing each rounding signal of the second set.

10. A data processing apparatus as claimed in claim 1, wherein if the m-bit fixed point number is an unsigned number or a positive signed number, the adder logic is operable to perform a like signed addition operation, whereas if the m-bit fixed point number is a negative signed number the adder logic is operable to perform an unlike signed addition operation.

11. A data processing apparatus as claimed in claim 1, wherein a single rounding mode is provided for producing the rounded floating point operand.

12. A data processing apparatus as claimed in claim 11, wherein the single rounding mode is a round-to-nearest rounding mode.

13. A data processing apparatus as claimed in claim 1, wherein the rounded floating point number is a single precision floating point number, and n is 24.

14. A data processing apparatus as claimed in claim 13, wherein the m-bit fixed point number is a 32-bit number.

15. A method of operating a data processing apparatus to convert an m-bit fixed point number to a rounded floating point number having an n-bit significand, where n is less than m, the method comprising the steps of:
   (a) determining the bit location of the most significant bit of the value expressed within the m-bit fixed point number;
   (b) determining from a selected number of least significant bits of the m-bit fixed point number a rounding signal indicating whether a rounding increment is required in order to generate the n-bit significand;

(c) in response to the rounding signal, generating a rounding bit sequence appropriate having regard to the bit location determined at said step (a);

(d) employing adder logic to add the rounding bit sequence to the m-bit fixed point number to generate an intermediate result; and (e) shifting the intermediate result to generate the n-bit significand.

16. A method as claimed in claim 15, wherein the rounding signal is set if the rounding increment is required, and if the rounding signal is not set the rounding bit sequence generated at said step (c) comprises all zeros.

17. A method as claimed in claim 15, wherein if the bit location determined at said step (a) is within the least significant n bits, the rounding bit sequence generated at said step (c) comprises all zeros.

18. A method as claimed in claim 15, wherein:
said step (b) comprises determining from the selected number of least significant bits of the m-bit fixed point number a plurality of rounding signals, each rounding signal being associated with a particular bit position and indicating whether a rounding increment is required in order to generate the n-bit significand if the most significant bit of the value expressed within the m-bit fixed point number resides at that associated bit position; and
in response to the plurality of rounding signals said step (c) generates a rounding bit sequence appropriate having regard to the bit location determined at said step (a).

19. A method as claimed in claim 18, wherein each rounding signal is set if the rounding increment is required, and if the rounding signal associated with the bit position determined at said step (a) is not set the rounding bit sequence generated at said step (c) comprising all zeros.

20. A method as claimed in claim 18, wherein at said step (a) a m-n bit value is produced identifying the bit location of the most significant bit of the value expressed within the m-bit fixed point number, and at said step (c) a logical AND operation is performed on the m-n bit value and the plurality of rounding signals in order to generate the rounding bit sequence.

21. A method as claimed in claim 20, wherein if the bit location determined at said step (a) is within the least significant n bits, a m-n bit value comprising all zeros is produced, thereby causing a rounding bit sequence comprising all zeros to be generated at said step (c).

22. A method as claimed in claim 18, wherein for each rounding signal said step (b) comprises the steps of:
determining from the selected number of least significant bits a significand initial least significant bit, a guard bit immediately to the right of the significand initial least significant bit, and a sticky bit produced by performing a logical OR operation on all other bits to the right of the guard bit, the location of the significand initial least significant bit being dependent on the bit location associated with the rounding signal; and
using the significand initial least significant bit, the guard bit and the sticky bit in determining that rounding signal.

23. A method as claimed in claim 22, wherein said step (b) produces first and second sets of rounding signals, the first set being referenced at said step (c) if the m-bit fixed point number is an unsigned number or a positive signed number, and the second set being referenced at said step (c) if the m-bit fixed point number is a negative signed number, at said step (b) modified versions of each significand initial least significant bit, guard bit and sticky bit being generated and the modified versions being used when computing each rounding signal of the second set.

24. A method as claimed in claim 15, wherein if the m-bit fixed point number is an unsigned number or a positive signed number, the adder logic is operable to perform a like signed addition operation, whereas if the m-bit fixed point number is a negative signed number the adder logic is operable to perform an unlike signed addition operation.

25. A method as claimed in claim 15, wherein a single rounding mode is provided for producing the rounded floating point operand.

26. A method as claimed in claim 25, wherein the single rounding mode is a round-to-nearest rounding mode.

27. A method as claimed in claim 15, wherein the rounded floating point number is a single precision floating point number, and n is 24.

28. A method as claimed in claim 27, wherein the m-bit fixed point number is a 32-bit number.

* * * * *